Figure 1:
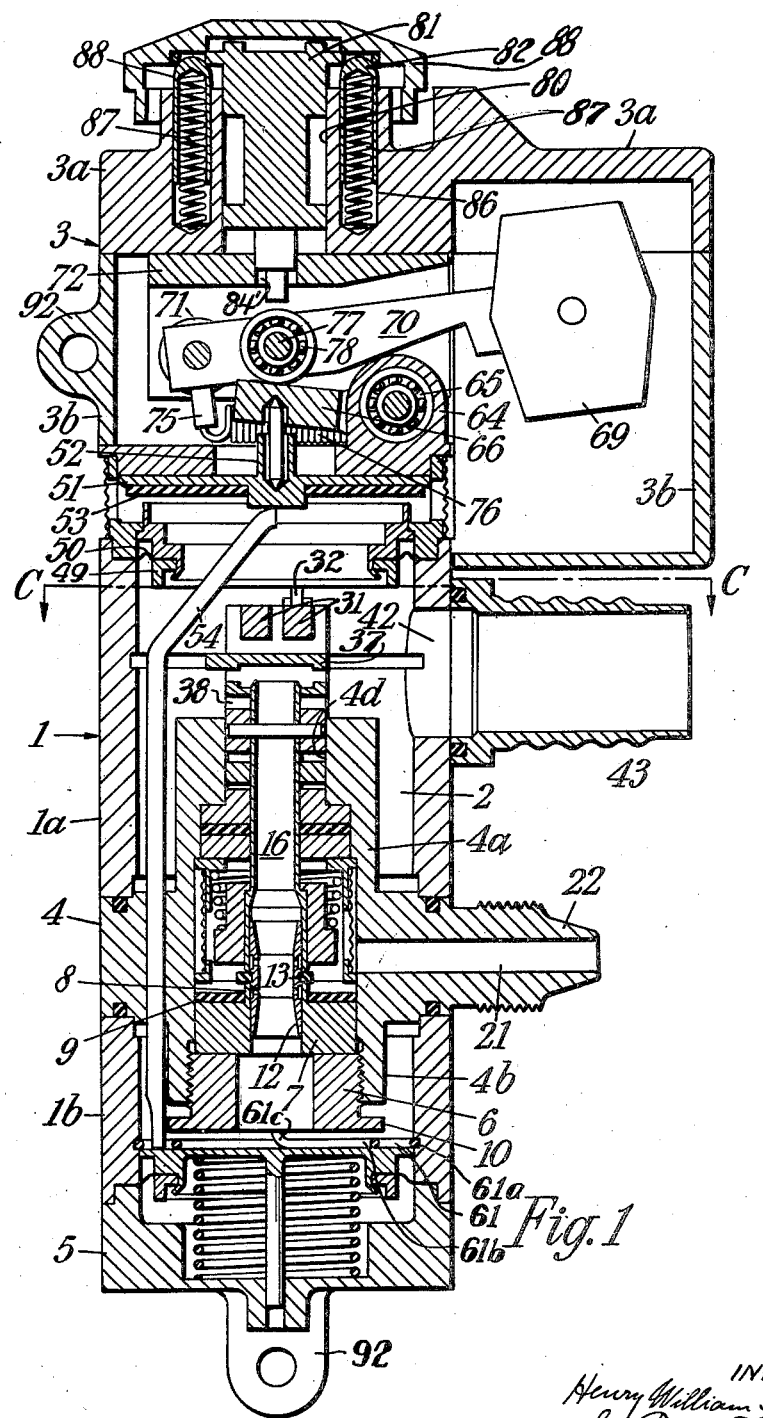

April 27, 1954  H. W. TREVASKIS  2,676,601
FLUID PRESSURE VALVE

Filed May 29, 1951  3 Sheets-Sheet 1

INVENTOR
Henry William Trevaskis
by Benj. T. Rauber
his attorney

April 27, 1954  H. W. TREVASKIS  2,676,601
FLUID PRESSURE VALVE
Filed May 29, 1951  3 Sheets-Sheet 2

INVENTOR
Henry William Trevaskis
by Benj. T. Rauber
his attorney

April 27, 1954  H. W. TREVASKIS  2,676,601
FLUID PRESSURE VALVE

Filed May 29, 1951  3 Sheets-Sheet 3

INVENTOR
Henry William Trevaskis
by Benj. T. Rauber
his attorney

Patented Apr. 27, 1954

2,676,601

UNITED STATES PATENT OFFICE 2,676,601

FLUID PRESSURE VALVE

Henry William Trevaskis, Solihull, England, assignor to Dunlop Rubber Company Limited, London, England, a British company Application May 29, 1951, Serial No. 228,816

22 Claims. (Cl. 137—45)

1

This invention relates to a fluid pressure valve, and more particularly to a pneumatic valve for automatically controlling the inflation pressure of an inflatable suit worn by aircraft pilots to prevent "blackout."

When the pilot of a fast aircraft is pulling out of a high-speed dive or is making a fast, tight turn, the blood tends to leave his head and the upper part of his body, due to the effect of centrifugal force, and to accumulate in the lower parts of his body. Not only is this a strain on the pilot's heart but it also induces the condition known as "blackout," which in its less severe form may comprise dizziness, deafness and partial loss of vision and in its more severe form total unconsciousness. Whilst blackout in its less severe form is always uncomfortable and possibly dangerous, in its more severe form it has frequently proved fatal, since the aircraft crashes before full consciousness is regained.

In an effort to prevent or reduce the possibility of blackout, a flying suit has been developed which is worn by pilots who are likely to be subject to this condition in the course of their duties, e. g., test pilots, fighter pilots, pilots of dive-bombers and the like. The suit comprises a trousers portion which is laced at the waist and down the legs and is provided with five inflatable zones. One zone extends over the stomach of the pilot, one lies against the fleshy portion of the inside of each thigh, and one against the inside of each calf. These inflatable zones are interconnected and communicate with a source of pneumatic pressure, and by operating a valve the pilot can inflate the zones to any desired pressure. These constrict the stomach and the other areas of the body containing large blood vessels and force the blood into the upper parts of the body, thus counteracting the effects of the centrifugal force when the pilot is making a turn or pulling out of a dive. Thus the blood is retained in the head and in the upper parts of the body and blackout is far less likely to occur.

The centrifugal force acting through the longitudinal axis of the pilot's body is normally referred to in units of "g," i. e. the acceleration due to gravity, or 32.2 ft./sec.$^2$. It is of course assumed that the pilot is normally in a seated posture. Thus a pilot may make a 3g or a 5g turn, implying thereby that the centrifugal force acting on the pilot is 3 or 5 times that of gravity. With a flying suit such as described above, it is customary to pressurize the inflatable zones with $x-1$ p. s. i., where $x$ is the "g" force acting on the pilot. Thus for a 5g turn the suit is most effec-

2 tive when pressurized at 4 p. s. i. It is not considered necessary to pressurize the suit for less than a 2g turn.

The object of this invention is to provide a pneumatic control valve which will automatically inflate an inflatable suit to a desired pressure when the wearer of the suit is subject to a centrifugal force of more than 2g, and will relieve the pressure when the force is removed.

According to the invention a fluid pressure control valve comprises an operating chamber adapted to be connected to a device to be operated, a pressure chamber adapted to be connected to a source of fluid pressure, a normally-closed inlet valve between said pressure chamber and said operating chamber, a normally-open exhaust valve between said operating chamber and exhaust, and means operable by centrifugal force to first close the exhaust valve and then open the inlet valve.

Preferably the fluid pressure operated valve comprises a valve housing containing an operating chamber adapted to be connected to a device to be operated, a pressure chamber arranged concentrically within said operating chamber and adapted to be connected to a source of fluid pressure, an inlet valve between said pressure chamber and said operating chamber, an exhaust valve between said operating chamber and exhaust, said exhaust valve having a valve seat slidable in said operating chamber, means operable by movement of the slidable exhaust valve seat to open the inlet valve, and a control housing secured to one end of the valve housing containing means operated by centrifugal force to first close the exhaust valve and then slidably move the exhaust valve seat to open the inlet valve.

When the control valve is used to control the pressure in an inflatable suit the operating chamber is connected to the suit and the pressure chamber to a source of pneumatic pressure.

Figure 2:
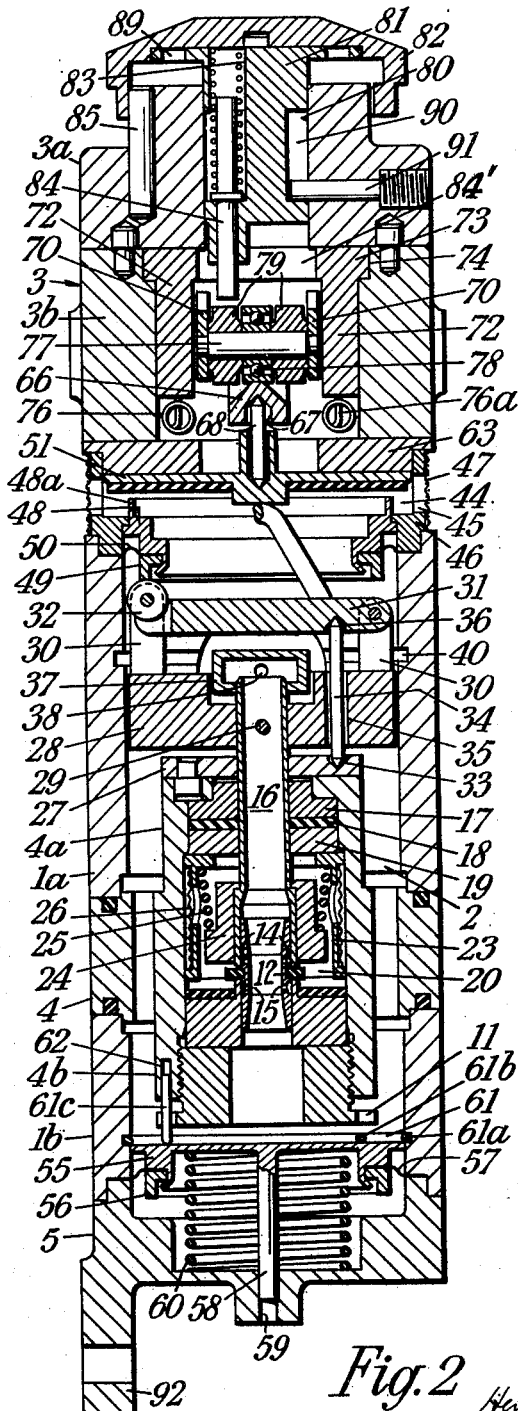
Figure 3:
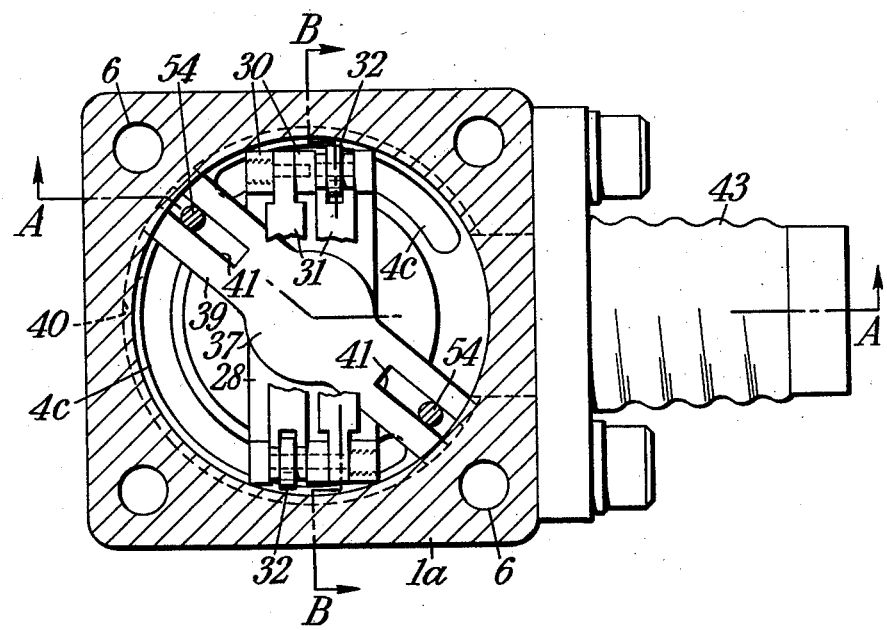

In order that the invention may be more fully described, reference is made to the accompanying drawings, of which:

Figure 1 is a section of the preferred embodiment of the invention taken through the line A—A of Figure 3 and looking in the direction of the arrows, Figure 2 is a section through B—B of Figure 3 looking in the direction of the arrows, Figure 3 is a section through C—C of Figure 1 looking in the direction of the arrows.

In one embodiment of the invention the control valve comprises a valve housing 1 of rectangular cross-section containing a cylindrical operating chamber 2. A control housing 3 is secured to one end of the valve housing. The control housing is also rectangular in cross-section and its longitudinal axis is normal to the axis of the valve housing and one end of the control housing is fitted flush with one side of the valve housing whilst the other end projects approximately one third of its length from the opposite side of the valve housing.

The valve housing 1 is formed of four parts, an upper valve housing part 1a, a lower valve housing part 1b, an inlet valve block 4 interposed between said parts, and a closure member 5 fitted to the end of the lower valve housing part. Said parts, and the control housing, are retained together by bolts (not illustrated) passing through holes 6 (Figure 3) in the corners of the valve housing. The valve block 4 is provided with two part-circular slots 4c to enable pressure fluid to pass from one end of the operating chamber to the other.

The inlet valve block extends across the cylindrical chamber and is provided with parts 4a, 4b, extending coaxially into both upper and lower valve housing parts. An annular gap is provided between the outer periphery of parts 4a and 4b and the inner periphery of parts 1a and 1b. The end of the valve block part 4a is provided with a diametral slot 4d. An axially-extending hole is provided centrally through the valve block part 4b which communicates with the base of the slot. Said hole is stepped to three diameters, the largest diameter being in the valve block part 4b, and the smallest diameter leading into the slot 4d, said latter diameter being greater than the width of the slot.

The largest diameter hole is internally threaded, and an annular adjusting screw 6 is fitted therein. The end of said screw abuts one side of an inlet valve member which comprises an annular member 7 slidable in the intermediate hole in the valve block and provided on its face remote from said screw and at its inner periphery with an annular valve seat 8 extending axially a short distance away from said member, the end of the valve seat being tapered to provide a knife-edge at the inner periphery thereof.

An annular rubber sealing ring 9 is fitted in the annular space between the valve seat 8 and the wall of the chamber, and this sealing ring serves to prevent the leakage of pressure fluid past the outer periphery of the annular member 7. The adjusting screw 6 is provided, on the side remote from the inlet valve member with an outwardly-turned annular flange 10 and equispaced around said flange are a plurality of slots 11 (Figure 2) of rectangular section, for a purpose to be later described.

A cylindrical sleeve 12 has one end slidably fitting in the central hole through the annular member 7. The sleeve is provided centrally on its outer periphery with an annular recess and fitting in said recess is a rubber seating ring 13 which extends radially outwardly from the sleeve. Equispaced on each side of said recess are two other recesses 14, and a plurality of equispaced and radially-extending holes 15 lead from the base of each of said latter recesses to the interior of the sleeve.

A tubular valve member 16 has one end slidably fitting over the other end of the sleeve 12, the end of said member being tapered to provide a knife-edge at the inner periphery thereof. Said knife-edge and the knife-edge associated with the inlet valve member are adapted to seat one on each side of the sealing ring 13.

The tubular valve member is stepped to two diameters, the larger diameter being slidable on the sleeve 12 and provided with the knife-edge and the smaller diameter extending axially through the valve block and standing proud of the slot 4d. The radial width of the step formed by the junction of said diameters is equal to the radial thickness of the wall of the larger diameter end.

The valve described above is of the kind forming the subject-matter of my co-pending application Ser. No. 263,615, filed December 27, 1951, now Patent No. 2,668,035, February 2, 1954.

An end plate 17 is fitted in the end of the smallest diameter hole in the valve block remote from the adjusting screw 6 and said plate is provided centrally with a hole through which the tubular valve member 16 slidably passes. A sealing ring 18 is fitted against the face of the end plate, and an annular lubricating ring 19 is fitted against the sealing ring. A fluid-tight pressure chamber 20 is thus formed within the intermediate hole in the valve block and this chamber communicates through a port 21, Fig. 1, in a nozzle 22 with a source of fluid pressure. An outer cylindrical sleeve 23 is tightly fitted within said chamber, having an inturned annular flange at one end thereof, and said flange abuts the lubricating ring 19 and serves to maintain said ring, the sealing ring and the end plate 17 in position. A collar 24 is fitted over the larger diameter end of the tubular valve member 16, having an outwardly-extending annular flange at one end thereof and an inturned flange at the other end to co-operate with the stepped portion of the valve member. A coiled spring 25 is fitted in compression between the outwardly-extending annular flange on the collar and the inturned annular flange on the sleeve 23. The sleeve 23 is provided with a plurality of holes extending radially therethrough, and a cylindrical filter element 26 is fitted to the outer periphery thereof.

A hardened steel plate 27 is secured to the base of the slot 4d, said plate being provided centrally with a hole through which the tubular valve member 16 slidably passes. A beam 28, of rectangular section, is also fitted within the slot and extends diametrically across the chamber. The beam is provided centrally with a hole through which the end of the tubular valve member is fitted, and the beam is secured to the valve member by a peg 29. At each end of the beam, on the face remote from the hardened steel plate, there is provided a post 30, to which is pivotally attached a lever arm 31. The two posts are offset, so that the lever arms lie side by side. A roller 32 is rotatably fitted to the end of each lever arm remote from the post. The hardened steel plate is provided, one on each side of the central hole, with two recesses 33, each of which accommodates the tapered end of a pivot pin 34 which passes loosely through corresponding holes 35 in the beam 28, the other end of each pin also being tapered and seating in a recess 36 in the side of a lever arm 31 adjacent the beam. The recess 36 is situated about $\frac{1}{18}$ of the length of the lever from the post 30.

The beam is centrally recessed on the face remote from the hardened plate, and a baffle is fitted therein, a clearance being provided to allow free movement of said beam. Said baffle comprises an annular box-structure 37 provided on the face adjacent the beam with a hole through which the end of the tubular valve member is slidably fitted. Two small holes 38 diametrically opposed on the sides of the baffle communicate with the operating chamber 2. The face of the baffle remote from the valve member is provided integrally with a rectangular locating member 39 (Figure 3) which extends diametrically across the chamber 2 and has its ends accommodated in an annular groove 40 formed in the peripheral walls of said chamber. The ends of the locating member are each provided with a radially-extending slot 41, for a purpose to be later described.

A circular orifice 42 is provided in the wall of the operating chamber, the axis of said orifice and that of the holes 38 in the baffle being substantially in line. A connection 43 is secured thereto, said connection being adapted to be connected to a flexible hose (not illustrated) leading to the inflatable suit.

An exhaust chamber 44 is formed between the operating chamber 2 and the control housing 3 and said exhaust chamber communicates with atmosphere through holes 45 in the peripheral wall 46 of said chamber. A gauze filter 47 prevents the ingress of foreign matter.

The exhaust chamber wall is formed with an inwardly-turned abutment, and an exhaust valve seat 48 is slidable within said wall and adapted to contact said abutment at one end of its range of travel. Said valve seat is provided with an annular seating portion 48a. A part of the valve seat extends into the operating chamber and a ring 49 is secured thereto. The inner peripheral edge of an annular rubberized silk diaphragm 50 is nipped between them in fluid-tight manner, the outer peripheral edge being nipped in similar manner between the end of the upper valve housing part 1a and the exhaust chamber wall 46. The ring 49 seats on the two rollers 32 associated with the lever arms 31.

The exhaust valve comprises a disc 51 slidable in the exhaust chamber and provided on the face remote from the exhaust valve seat with a central axially extending boss 52 having an axially extending blind hole. A rubber annulus 53 is secured to the other face and is adapted to contact the annular seating portion 48a of the valve seat.

The closed end of a U-shaped member 54 abuts the centre of the exhaust valve disc and extends axially through the operating chamber to a location adjacent the closure member 5. The arms of said members pass through the slots 41 in the locating member 39, extend one on each side of the inlet valve mechanism, and pass through holes provided in the inlet valve block 4. The ends of said arms abut the face of a spring-retaining member 55 which is slidable in the lower valve housing part 1b. Said member 55 has a ring 56 secured to the side thereof adjacent the closure member 5 and nipped in fluid-tight fashion between said ring and member is the inner peripheral edge of an annular rubberized silk diaphragm 57, the outer edge thereof being nipped in similar manner between the end of the lower valve housing part 1b and the closure member 5. The spring-retaining member is provided integrally with a stem 58 which extends axially through a hole 59 provided in the closure member. A helical spring 60 is fitted in compression between the spring-retaining member and the closure member. Movement of the spring-retaining member in a direction towards the inlet valve block is limited by a circlip 61 comprising an outer spring wire strand 61a fitting in a recess provided in the peripheral wall of the chamber and an inner spring wire strand 61b integral therewith and having an end 61c at right angles to the plane of the circlip and passing through one of the slots 11 in the flange of the adjusting screw 6 into one of a plurality of axially-extending holes 62 provided in the end of the part 4b of the inlet valve block. The ends of the U-shaped member 54 pass between the inner and outer strands of the circlip.

A square end plate 63 is secured to the end of the exhaust chamber remote from the operating chamber and said end plate is provided centrally with a hole through which the boss of the exhaust valve disc extends. Situated centrally on the side of the end plate adjacent the projecting portion of the control housing is a boss 64 and mounted through roller bearings 65 to said boss is one end of an arm 66 which extends across the centre of the plate. The arm is provided with a blind hole 67 in register with the hole in the boss of the exhaust valve disc and a peg 68 extends between said two parts, one end in each hole.

A metal mass 69 of predetermined weight is provided centrally in the outwardly projecting portion of the housing 3 and is secured to one end of a bifurcated lever arm 70 which extends longitudinally of the housing to a location adjacent its other end where it is pivotally secured, through roller bearings 71, to a carriage 72 of inverted channel section. The bifurcated lever arm lies inside the carriage and the base of the carriage is provided with splines 73 which run in grooves 74 in the portion of the housing walls remote from the square end plate.

The two adjacent ends of the bifurcated arm which are connected to the carriage are provided with lugs 75 which extend towards the end plate and secured to each of said lugs is one end of a coiled helical spring 76 which extends towards the weight and parallel with the end plate. The end of each spring remote from the lugs is provided with a straight portion 76a which fits into a hole (not illustrated) drilled at an angle in the end of the walls of the carriage adjacent the weight.

A spindle 77 is secured between the two parts of the bifurcated arm intermediate its pivotting end and its weighted end, the centre of the spindle lying on the longitudinal axis of the operating chamber and the axis of the spindle is normal to said axis. Mounted centrally on the spindle is a roller bearing 78, the outer race of which abuts the arm 66 pivotally secured to the end plate. Also mounted on the spindle are two spacer washers 79, one on each side of the bearing, having the same diameter as that of the outer race of the bearing.

The control housing 3 is in two parts, an upper part 3a and a lower part 3b. The upper part of the housing is secured to the lower part and thus totally encloses the mechanism for automatically controlling the valve. The upper part of the housing likewise contains means for manually testing the functioning of the valve and pressure suit. This part of the housing is provided with a cylindrical bore 80 extending therethrough, the bore being co-axial with the longitudinal axis of the operating chamber, and a plug 81 is slidably fitted in said bore. A circular press cap 82 is secured to the end of the plug exterior of the housing and an eccentric hole 83 extends axially through the plug. A spring-urged peg 84 is slidably fitted in said hole, and one end of said peg extends through a rectangular slot 84', Fig. 2, in the base of the carriage and, in one angular position of the cap, is closely spaced from the outer periphery of one of the spacing washers 79, which is mounted on the spindle extending between the two parts of the bifurcated arm. The axis of the slot is parallel to that of the spindle and is in line therewith.

The press cap is marked "H" and "L" at two diametrically opposed locations and is marked "M" at a location at right angles thereto. These letters indicate High, Medium and Low pressures. The cap may be rotated through 180° to bring any of these letters into register with an arrow painted on the end of the housing. Further angular movement of the cap is prevented by a peg 85 secured to the housing engaging with stops provided on the cap.

The upper part of the housing is provided with two axially-extending holes 86, one on each side of the bore and a helical spring 87 is fitted in each hole having a plunger 88 with a rounded end and which projects exterior of the housing. The plungers are adapted to move into holes 89 in the under surface of the cap when the arrow and any one of the letters are in register. This not only holds the cap in any of the three positions but also gives an audible warning to the pilot when a letter is in register.

The plug fitting in the upper part of the housing is provided intermediate its ends with a part annular recess 90 of rectangular section. A pin 91 is screw-fitted through the housing and extends into said recess. When the springs associated with the plug and upper part of the housing are uncompressed, the end of the pin abuts the end of the recess remote from the cap. This pin prevents the plug from quitting the bore and also permits a certain amount of axial movement of the plug and cap relative to the housing.

Two lugs 92 are provided, one integral with the closure member 5 and one integral with the lower control housing part 3b, whereby the control valve may be secured to a part within the cockpit of an aircraft.

The automatic control valve is set before use by adjusting the adjusting screw 6 so that the knife edges associated with the valve seat 8 and the tubular valve member 16 seat lightly but fluid-tightly one on each side of the seating ring 13. The spring 25 is fitted to ensure a positive seating action. The adjusting screw is retained in position by portion 61c of the circlip passing through one of the slots 11 in the flange 10 of said screw and into one of the holes 62 in the valve block part 4b. The valve is secured in the cockpit of the aircraft adjacent the pilot with its longitudinal axis in a vertical position, i. e. parallel to the longitudinal axis of the upper part of the pilot's body and with the control housing part of the valve uppermost. The inlet nozzle 22 is connected to a source of pneumatic pressure and the connection 43 is connected to an inflatable flying suit of the type described. The inlet valve is thus closed and the exhaust valve is kept open by the U-shaped member which is urged upwardly by the spring 60.

The tubular valve member is "balanced" in operation, i. e. the force exerted by the pressure in the pressure chamber and acting on the step of the valve member in a downward direction is equal to the vertical component of the force acting on the chamfered end of the member in the opposite direction. The force required to open the valve is thus little more than that required to compress the spring 25.

The operation of the valve is as follows. As the pilot of the aircraft levels off after a dive, or makes a tight turn, the centrifugal force, acting through the vertical axis of his body, tends to drain the blood into the lower portions of his body, as previously described, hence inducing the condition of "blackout." The same centrifugal force, however, acts on the mass 69 of known weight secured to the end of the bifurcated lever arm 76, and likewise forces this weight vertically downwards. This imparts an angular movement to the lever arm, and hence the roller bearing 78, which abuts the arm 66 pivotally connected to the square end plate 63, forces the arm in the same direction, this force being transmitted through the peg 68 to the disc 51 of the exhaust valve.

The disc of the exhaust valve is connected, through the U-shaped member previously described, to the spring-retaining member 55 at the other end of the operating chamber which abuts the spring 60 situated between said member and the closure member 5 at the end of the operating chamber. A force of less than 2g, acting on the weight and through the exhaust valve disc and U-shaped member, will not compress the spring far enough to allow the valve disc to move on to the valve seat, and thence open the inlet valve. The valve is therefore in-operative with a force of less than 2g.

With a force of 2g and more, however, the spring 60 will compress sufficiently to allow the exhaust valve to first seat on the exhaust valve seat 40a and then to move the exhaust valve seat downwards. The ring 49 secured to said seat is seated on the two rollers 32 associated with the lever arms 31. Downward movement of the two rollers thus causes the lever arms to pivot about the pins 34, each of which has one end associated with the hardened steel plate 27 in the base of the slot in the rigid valve block part. An upward movement is thus imparted to the ends of said lever arms remote from the rollers. These ends are secured to the posts 30, which are solid with the beam 28. The beam in turn is secured to the tubular valve member 16. Thus as the exhaust valve seat is moved downwardly the tubular valve member is moved upwardly. The arms 31 are arranged as a 5:1 lever, thus for a downward movement of the valve seat of, e. g. 0.0005" the tubular valve seat will move upwardly 0.0001". The inlet valve is "cracked" and pressure fluid flows through the sleeve 12 and thence into the operating chamber 2.

A baffle 37 is fitted to the end of the tubular valve member remote from the inlet valve to prevent the pressure wave from impinging directly on the levers and thus upsetting the valve movement. Pressure fluid thus flows into the baffle and through the small holes at the side thereof into the operating chamber. From the operating chamber the pressure fluid flows into the inflatable suit.

Back pressure builds up in the operating chamber, and this reacts on the effective area of the exhaust valve. It is of course understood that the diaphragms at each end of the operating chamber prevent leakage of pressure. Pressure will continue to build up in the suit and in the operating chamber until the force caused by the pressure in the chamber acting over the effective area of the exhaust valve combined with the force of the spring 60, overcomes the centrifugal force on the weight, when the exhaust valve and valve seat will move up sufficiently to permit the inlet valve to seat under the action of the said spring. Both inlet and exhaust valves will now be closed, and the pressure will be held in the suit and in the chamber until the centrifugal force is relieved on the weight, thus permitting the exhaust valve to lift under the combined action of the spring at the end of the chamber and the pressure within the chamber and suit.

Thus it will be seen that the action of the valve is completely automatic. The degree of centrifugal force exerted on the weight determines its range of movement, and upon this movement depends the amount of pneumatic pressure allowed into the suit before the inlet valve is closed. As soon as the centrifugal force on the weight is relieved the air in the suit will automatically flow to atmosphere.

The pilot of the aircraft may manually pressurize his suit irrespective of the automatic mechanism by pressing on the end cap of the upper part of the housing. On pressing the cap as far as it will go the spring associated with the eccentric peg will force the peg against the spacing washer associated with the bearing which operates the exhaust valve. This spring is so calibrated as, e. g., to produce a force on the exhaust valve equal to a 4g force on the weight, i. e. equivalent to a 3 p. s. i. pressure in the suit. This pressure may be varied by turning the end cap to indicate Low or High pressure. When this happens the plug associated with the cap makes an angular movement of 90° and the eccentric peg, which projects through the slot in the carriage, moves the carriage, complete with weight, bodily to one side or the other in a transverse direction. The outer race of the bearing which abuts the lever arm pivotally secured to the square end plate moves along said arm to one side or the other of the longitudinal axis of the chamber. Hence, assuming that the end cap is turned to indicate High pressure, when the end cap is pressed the calibrated spring exerts a known force on the bearing, and, because a mechanical advantage is gained by the movement of the bearing along the lever arm, the force on the exhaust valve disc is increased to give a suit pressure of 4 p. s. i. Similarly if the end cap is turned to indicate Low pressure the bearing moves in the other direction and the force on the exhaust valve disc is reduced to give a suit pressure of 2 p. s. i.

The pilot may, of course, leave the end cap indicating either High or Low pressure, in which case, when the valve is automatically operated, the pressures in the suit will be either greater or less than the calculated pressures obtainable at a medium registration.

Having described my invention, what I claim is:

1. A fluid pressure control valve which comprises in successive axially aligned, spaced relation, a fluid pressure supply chamber, an operating chamber and an exhaust chamber, a fixed annular inlet valve seat in said pressure supply chamber, an axially slidable tubular valve extending from said operating chamber to seat on said fixed annular valve seat and movable axially from said valve seat to admit fluid to said operating chamber, an axially slidable annular valve seat between said operating chamber and said exhaust chamber, an axially movable exhaust closing valve, a spring balanced pivoted mass positioned to be actuated by centrifugal force to move said closing valve to said axially slidable annular valve seat and to thereupon displace said valve seat toward said inlet valve, and a transmission from said annular slidable valve seat to said inlet valve to move said inlet valve to open position.

2. The fluid pressure control valve of claim 1 in which said transmission comprises a lever to reverse the axial movements of said slidable annular valve seat and said axially slidable inlet valve.

3. The fluid pressure control valve of claim 1 in which said pivoted mass is mounted on a spring retracted lever and comprises a second lever actuated by the first lever and acting on said exhaust valve.

4. The fluid pressure control valve of claim 3 having manually operated shifting means to change the mechanical advantage of said levers.

5. A fluid pressure control valve comprising a valve housing containing an operating chamber, a pressure chamber positioned co-axially within said operating chamber, an inlet valve between said pressure chamber and said operating chamber, an exhaust valve between said operating chamber and exhaust, an exhaust valve seat slidable in said operating chamber, means operable by displacement of said slidable exhaust valve seat to open the inlet valve, a control housing secured to one end of the valve housing, a mass in said control housing movable by centrifugal force first to close the exhaust valve and then to displace the exhaust valve seat to open the inlet valve, said inlet valve comprising an annular member secured to the end of the pressure chamber remote from the centrifugally operated means and having an annular valve seating portion extending axially within said chamber, a tubular valve member co-axial with said annular member having one end slidably fitted through the end of said chamber nearest said mass and the other end provided with an annular valve seat, a sleeve slidable in said end and in said seating portion, a plurality of holes extending radially through said sleeve and a seating ring extending radially from the outer periphery thereof to co-operate with said valve seat and valve seating portion.

6. A fluid pressure control valve according to claim 5 wherein said means operable by movement of the exhaust valve seat to open the inlet valve comprises a beam secured to the end of the tubular valve member exterior of the pressure chamber, a post secured to each end of the beam on the face remote from the inlet valve, two levers each having one end pivotally attached to a post and having a roller at the other end to co-operate with the exhaust valve seat and two pins each having one end fitted in a recess in the adjacent end wall of the pressure chamber, passing through a hole in said beam and having the other end fitted in a recess in said lever adjacent said post, whereby movement of the exhaust valve seat in one direction, acting through the levers, posts and beam, moves the tubular valve member in the other direction.

7. A fluid pressure control valve according to claim 5 wherein the diameter of the tubular valve member within the pressure chamber is stepped outwardly, the effective radial width of said step being equal to the width of the wall of said member.

8. The fluid pressure control valve mechanism of claim 5 in which the seating end of the tubular valve is chamfered to its inner edge and its outer surface is stepped inwardly above said seating edge to the inner diameter of said seating edge.

9. A fluid pressure control valve comprising a valve housing containing an operating chamber, a pressure chamber positioned co-axially within said operating chamber, an inlet valve between said pressure chamber and said operating chamber, an exhaust valve between said operating chamber and exhaust, an exhaust valve seat slidable in said operating chamber, means operable by displacement of said slidable exhaust valve seat to open the inlet valve, a control housing secured to one end of the valve housing, a mass in said control housing movable by centrifugal force first to close the exhaust valve and then to displace to exhaust valve seat to open the inlet valve, a bifurcated arm having said mass secured to one end thereof, the other end of said arm being pivotally secured to a carriage within said housing, a bearing secured between the bifurcations of said arm intermediate its ends, an actuating arm pivotally secured to said housing and abutting said bearing, a helical spring to hold said bifurcated arm in a predetermined angular position and a peg fitted between the arm pivotally secured to the housing and the exhaust valve, whereby movement of the mass in one direction deflects the bifurcated arm against the force of the helical spring, and movement of the bearing, acting through the actuating arm and peg, moves the exhaust valve to first seat on the exhaust valve seat and then to move the exhaust valve seat to open the inlet valve.

10. A fluid pressure control valve according to claim 9 provided with means to manually operate the valve irrespective of the force exerted by the mass, said means comprising an axially movable end cap fitted to the control housing and concentric with the exhaust valve, a plug secured thereto and axially slidable in a bore in said housing, a hole extending axially through said plug and a spring-loaded peg in said hole having one end adapted to contact the bearing associated with the bifurcated arm on axial movement of said cap, whereby on axial movement of the cap a force determined by the rating of the spring is exerted on the bearing to close the exhaust valve and open the inlet valve.

11. A fluid pressure operated valve according to claim 10 provided with means to vary said manually operated force, said means comprising an axially movable and rotatable end cap, a spring-loaded peg eccentrically located in said plug and a transversely-slidable carriage in said housing provided with a slot through which said peg projects to contact said bearing when the end cap is depressed, whereby rotation of the end cap in one direction slides the carriage to move the bearing along the actuating arm and thereby increase the effective load on the exhaust valve and rotation of the cap in the other direction slides the carriage to move the bearing along the arm to decrease the effective load on the exhaust valve.

12. A fluid pressure control valve comprising a valve housing containing an operating chamber, a pressure chamber positioned co-axially within said operating chamber, an inlet valve between said pressure chamber and said operating chamber, an exhaust valve seat slidable in said operating chamber, means operable by displacement of said slidable exhaust valve seat to open the inlet valve, a control housing secured to one end of the valve housing, a mass in said control housing movable by centrifugal force first to close the exhaust valve and then to displace the exhaust valve seat to open the inlet valve, wherein said exhaust valve comprises an exhaust valve seat axially slidable in said operating chamber, an exhaust valve to seat on said exhaust valve seat, a ring secured to said exhaust valve seat and an annular flexible diaphragm having its inner periphery secured between said seat and said ring and its outer periphery secured between two parts of the valve housing wall.

13. A fluid pressure control valve comprising a valve housing containing an operating chamber, a pressure chamber positioned co-axially within said operating chamber, an inlet valve between said pressure chamber and said operating chamber, an exhaust valve between said operating chamber and exhaust, an exhaust valve seat slidable in said operating chamber, means operable by displacement of said slidable exhaust valve seat to open the inlet valve, a control housing secured to one end of the valve housing, a mass in said control housing movable by centrifugal force first to close the exhaust valve and then to displace to exhaust valve seat to open the inlet valve, a spring-retaining member slidably fitted in the end of the operating chamber remote from the exhaust valve, a ring secured to said member, an annular flexible diaphragm having its inner periphery secured between said ring and said member and its outer periphery secured between two parts of the valve housing wall, a compression spring fitted between said member and the adjacent end of the housing and a U-shaped member having its two ends seated on said spring-retaining member and its closed end abutting the exhaust valve.

14. A fluid pressure control valve mechanism which comprises in successive, axially spaced, relation, a pressure fluid supply chamber, an operating chamber, and an exhaust valve movable axially toward said operating chamber, a fixed inlet valve seat in said pressure supply chamber, a tubular valve opening into and sealed in said operating chamber to seat on said fixed valve seat and movable from said fixed valve seat to admit fluid through said tubular valve to said operating chamber, an axially movable, exhaust closing valve seat sealed in said operating chamber in position to be closed by said exhaust valve, a transmission from said exhaust closing valve seat to said tubular valve to move said tubular valve from said fixed inlet valve seat as said exhaust valve seat moves toward said fixed inlet valve seat, and a spring supported mass movable under force acting against said spring to move said exhaust valve to close on said exhaust closing valve seat and to move said exhaust closing valve seat toward said fixed inlet valve seat to move said tubular valve from said fixed valve seat.

15. The fluid pressure control valve mechanism of claim 14 in which said mass is pivoted eccentrically of its center of gravity.

16. The fluid pressure control valve mechanism of claim 14 in which said mass is mounted on a pivoted lever bearing on said exhaust valve.

17. The fluid pressure control valve mechanism of claim 16 having a plunger slidable manually to tilt said lever to move said exhaust valve toward said exhaust closing valve seat.

18. The fluid pressure control valve mechanism of claim 14 which comprises a transmitting lever between said mass and said exhaust closing valve seat and bearing on said exhaust valve seat with a constant lever arm and a carriage for said mass manually slidable to move the bearing point of said mass on said transmitting lever along said lever arm.

19. The fluid pressure control valve mechanism of claim 14 having a baffle at the delivery end of said tubular valve.

20. The fluid pressure control valve mechanism of claim 14 having a lever system between said exhaust closing valve seat and said tubular valve to move said tubular valve in a direction opposite to that of said exhaust closing valve seat.

21. The pressure fluid control valve mechanism of claim 20 in which said lever system comprises a pair of levers in spaced, reversed, symmetrical positions.

22. The fluid pressure control valve mechanism of claim 14 in which said fixed valve seat comprises a cylindrical ring within the tubular valve and a resilient annular ring fixed on said sleeve.

References Cited in the file of this patent

UNITED STATES PATENTS

| Number | Name | Date |
|---|---|---|
| 1,596,770 | Sheer | Aug. 17, 1926 |
| 2,345,223 | Upp | Mar. 28, 1944 |
| 2,499,793 | Stearns | Mar. 7, 1950 |

FOREIGN PATENTS

| Number | Country | Date |
|---|---|---|
| 604,304 | Great Britain | July 1, 1948 |